No. 895,446. PATENTED AUG. 11, 1908.
H. W. FORSSMAN.
STRAINER.
APPLICATION FILED MAR. 16, 1908.
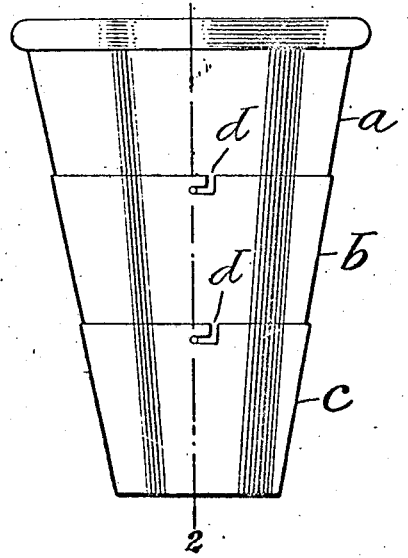
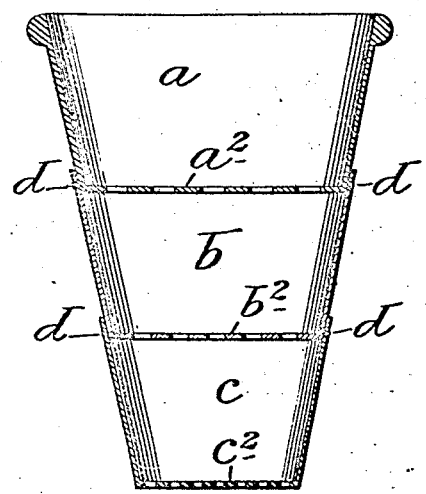
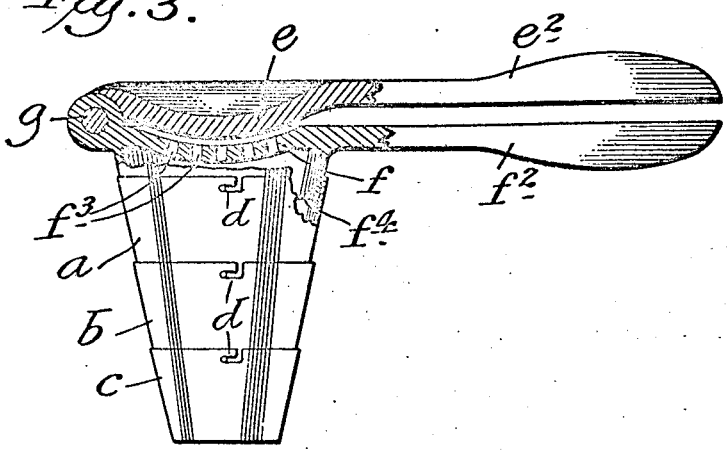
WITNESSES
INVENTOR
Hugo W. Forssman,
BY Edgar Tate & Co.
ATTORNEYS.

UNITED STATES PATENT OFFICE.

HUGO W. FORSSMAN, OF NEW YORK, N. Y.

STRAINER.

No. 895,446.  Specification of Letters Patent.  Patented Aug. 11, 1908.

Application filed March 16, 1908. Serial No. 421,548.

*To all whom it may concern:*

Be it known that I, HUGO W. FORSSMAN, a subject of the King of Sweden, and residing at New York, in the county of New York and State of New York, have invented certain new and useful Improvements in Strainers, of which the following is a specification, such as will enable those skilled in the art to which it appertains to make and use the same.

This invention relates to strainers, and the object thereof is to provide an improved device of this class designed particularly for use in straining the juice of lemons, oranges and similar fruits; a further object being to provide an improved strainer for the purpose specified by means of which the seeds of the fruit and all the fleshy substances may be removed or separated from the juice at a single operation; and with these and other objects in view the invention consists in a device of the class specified constructed as hereinafter described and claimed.

The invention is fully disclosed in the following specification, of which the accompanying drawing forms a part, in which the separate parts of my improvement are designated by suitable reference characters in each of the views, and in which:—

Figure 1 is a side view showing my improved strainer formed independently of a juice extractor or lemon squeezer, Fig. 2 a view similar to Fig. 1 but showing the device in section, and;—Fig. 3 a sectional side view showing my improvement applied to a lemon squeezer or juice extractor.

In the practice of my invention as shown in Figs. 1 and 2, I provide a strainer composed of a plurality of separate detachable and telescopic members $a$, $b$ and $c$ all of which are preferably cup-shaped in form and open at the top and provided with perforated bottoms as shown at $a^2$, $b^2$ and $c^2$, forming screens.

The separate parts or members of the strainer may be connected by friction if desired, or they may be connected by ordinary bayonet joints as shown at $d$, or they may be connected if desired by screw threads.

The screen $a^2$ in the bottom of the top part or member $a$ of the strainer is of much larger mesh than the screen $b^2$ in the bottom of the intermediate part or member $b$, and the screen in the bottom of the intermediate part or member $b$ is of larger mesh than the screen in the bottom of the bottom part or member $c$. With this construction all the larger fleshy substances and seeds will be caught in the top part or member $a$ of the strainer, while the smaller fleshy and other substances will be caught in the intermediate or second member $b$ of the strainer, while the still smaller fleshy and other substances, if any, will be caught in the bottom part or member $c$ and the juice will escape from the bottom part or member $c$ in a condition free from all seeds, fleshy and other substances, and a single operation will be sufficient to prepare the juice for use.

It is customary, in practice, to pass the juice of lemons, oranges, and similar fruits through a number of separate strainers of different mesh in order to free the juice of seeds, fleshy and other substances, but with my improvement this result may be accomplished at a single operation, and the separate parts or members of the strainer may be disconnected and thoroughly cleaned whenever desired.

Although I have shown and described the separate parts or members of my improved strainer as cup-shaped in form or larger at the top than the bottom, it will be apparent that this is not absolutely necessary, and although I have shown the screens in the bottom of the separate parts or members as composed of perforated material, it will be apparent that the same may be composed of wire gauze, the mesh of which may be regulated as desired.

In Fig. 3 of the drawing, I have shown an ordinary lemon squeezer or juice extractor composed of two cup-shaped jaw members $e$ and $f$ hinged together at one side as shown at $g$ and provided at the opposite side with handles $e^2$ and $f^2$. The bottom member $f$ is perforated as shown at $f^3$ in order to permit of the escape of the juice from between the members $e$ and $f$ in the usual manner, and the bottom member $f$ is also provided with a flange or rim $f^4$ with which, in practice, the top part or member $a$ of the strainer is connected, and this connection may be made in a manner similar to that of connecting the separate parts or members of the strainer itself, either telescopically and by friction, or by a bayonet joint or by screw threads. With this form of construction the juice may be extracted from a lemon, orange or other fruit in the usual manner by placing the fruit between the parts $e$ and $f$ and compressing the same by means of the handles $e^2$ and $f^2$, and the juice will flow downwardly into and through the separate parts or members of the strainer, and the seeds, fleshy and other substances will be separated therefrom, the entire operation of extracting the juice and straining the same being performed at a single operation, and the strainer may be detached from the juice extractor and the separate parts or members may be disconnected and cleaned whenever desired.

Having fully described my invention, what I claim as new and desire to secure by Letters Patent, is:—

1. A lemon juice extractor and strainer, comprising two separate cup-shaped jaws pivoted together at one side and provided at the opposite side with handles, the bottom jaw being also perforated and provided with a depending flange or rim, and a strainer composed of separate cup-shaped members detachably connected, the top member being detachably connected with said flange or rim, and all of said cup-shaped members being provided in the bottom thereof with screens of different mesh.

2. A lemon juice extractor and strainer, comprising two cup-shaped jaws pivoted together at one side and provided at the opposite side with handles, and a strainer detachably connected with the bottom jaw, said strainer being composed of separate cup-shaped members detachably secured to the bottom jaw of the juice extractor and all of said cup-shaped members being provided in the bottom thereof with a screen, said screens being of different mesh.

In testimony that I claim the foregoing as my invention I have signed my name in presence of the subscribing witnesses this 14th day of March 1908.

HUGO W. FORSSMAN.

Witnesses:
M. E. DOODY,
C. E. MULREANY.